United States Patent
Chung et al.

(10) Patent No.: US 12,545,881 B2
(45) Date of Patent: Feb. 10, 2026

(54) HEATING CULTURE DEVICE USED TO PROVIDE ENVIRONMENT WITH VERTICAL TEMPERATURE DIFFERENCE, AND METHOD OF USING THE SAME

(71) Applicant: iPreg Inc., Taipei (TW)

(72) Inventors: Chen-Yen Chung, Taipei (TW); Ching-Wen Chang, Taipei (TW); Chung-Hsien Huang, Taipei (TW); Bor-Ran Li, Toufen (TW)

(73) Assignee: iPreg Inc., Taipei (TW)

( * ) Notice: Subject to any disclaimer, the term of this patent is extended or adjusted under 35 U.S.C. 154(b) by 530 days.

(21) Appl. No.: 18/195,946

(22) Filed: May 11, 2023

(65) Prior Publication Data

US 2024/0318118 A1    Sep. 26, 2024

(30) Foreign Application Priority Data

Mar. 21, 2023  (TW) .................................. 112110525

(51) Int. Cl.
*C12M 1/02*    (2006.01)
*C12M 1/00*    (2006.01)
*C12M 1/34*    (2006.01)

(52) U.S. Cl.
CPC ............ *C12M 41/18* (2013.01); *C12M 23/34* (2013.01); *C12M 41/12* (2013.01); *C12M 47/04* (2013.01)

(58) Field of Classification Search
CPC ...... C12M 41/18; C12M 47/04; C12M 41/12; C12M 23/34; C12M 23/38; C12M 23/48; C12M 29/20
See application file for complete search history.

(56) References Cited

U.S. PATENT DOCUMENTS

| | | | |
|---|---|---|---|
| 2011/0250690 A1 | 10/2011 | Craig | |
| 2016/0299165 A1* | 10/2016 | Zhou | G01N 33/50 |
| 2019/0352594 A1 | 11/2019 | Matsumoto et al. | |
| 2021/0178394 A1 | 6/2021 | Asghar | |

FOREIGN PATENT DOCUMENTS

| | | | |
|---|---|---|---|
| CN | 103370409 | 10/2013 | |
| CN | 107099444 | 8/2017 | |
| TW | 201713765 | 4/2017 | |
| TW | 202233824 | 9/2022 | |
| WO | 2001040436 | 6/2001 | |
| WO | 2010149292 | 12/2010 | |
| WO | WO-2016117957 A1 * | 7/2016 | B01L 7/52 |

* cited by examiner

*Primary Examiner* — Liban M Hassan
(74) *Attorney, Agent, or Firm* — Fei-hung Yang

(57) ABSTRACT

Disclosed are a heating culture device used to provide an environment with a vertical temperature difference and a method of using the heating culture device. The heating culture device is provided for accommodating and heating a cell separation device which carries living cells having flagella and capable of moving autonomously and has a film for passing through the living cells and partitioning the cell separating device into upper and lower chambers. The heating culture device includes a carrying assembly, a chip carrier box, a case assembly and a control assembly. When a cover of the heating culture device is covered during operation, the control assembly can control driving state of an upper electric heating plate at the cover according to the temperature of a heat spreader set on the cover; and control a fan at the bottom according to the temperature at the bottom of the chip carrier box.

18 Claims, 7 Drawing Sheets

HEATING CULTURE DEVICE USED TO PROVIDE ENVIRONMENT WITH VERTICAL TEMPERATURE DIFFERENCE, AND METHOD OF USING THE SAME

CROSS-REFERENCE TO RELATED APPLICATIONS

This non-provisional application claims priority under 35 U.S.C. § 119(a) on Patent Application No(s). 112110525 filed in Taiwan, R.O.C. on Mar. 21, 2023, the entire contents of which are hereby incorporated by reference.

BACKGROUND OF THE DISCLOSURE

Technical Field

The present disclosure relates to a technology of culturing living cells having flagella, more particularly relates to the field of a heating culture device used to provide an environment with a vertical temperature difference and having a special structural design that creates a stable and accurate environment with a vertical temperature gradient difference, provides different vertical temperatures to a cell separation device that carries living cells, and drives the living cells to move in a thermotactic manner in order to sort the required living cells.

Description of the Related Art

In the field of cell culture, there are quite a few cell culture techniques and approaches available based on the different properties and types of cells. At present, a common cell culture technique is to use a Petri dish to perform a planar culture of the cells. In the culture process, the cells can directly and accurately reflect their life state and behavioral norm, which are quite helpful for researchers to carry out related research. In common practice, a cell culture incubator is used to provide a closed culture environment with constant temperature and humidity.

For living cells having flagella and capable of moving autonomously, the culture application is mostly different from the above-mentioned purpose of proliferating cells, but mainly for the purpose of sorting and selecting healthy cells with better motility. Based on the unique characteristics of the living cells having flagella and capable of moving autonomously, there are various technologies in the academic circle that can be used to cultivate and sort the living cells, such as the swim-up method and the density gradient centrifugation. However, due to the damage of living cells caused by the long operation time or the action of centrifugal force, another method was introduced. For example, a horizontal microfluidic channel chip was used to drive the living cells with high activity to pass through a flow field and to be concentrated in a specific area before being transported to the exit. The operation of the horizontal microfluidic channel chip is time-consuming, and the capacity is too small, resulting in insufficient number of sorted cells. Later studies have shown that one of the factors of prompting the activity of the living cell is temperature difference. In response to different temperatures, the living cell has the characteristic of swimming towards a high-temperature area. Therefore, the healthy living cells with relatively better activity can be collected without damaging the DNA of the cells by using the thermotactic characteristic of the living cells. However, the interior of existing cell culture incubators can only be set with a single environmental condition, so that it is not conducive to the cultivation and sorting of living cells of the above-mentioned type.

Although there were devices developed for the living cell cultivation requirements, for example, a horizontal temperature change is provided through a heater, so that the living cells can move in the horizontal direction in response to the temperature difference, and healthy living cells can be sorted accordingly. However, this approach requires a relatively larger volume of the device, and a low-temperature tank and a high-temperature tank must be separated from each other with a certain distance in order to generate a temperature difference gradient that can effectively drive the living cells to move, and it is not easy to obtain sufficient living cells from such device.

In view of the aforementioned problems of the related art, the research team of this disclosure has previously filed the U.S. patent application Ser. No. 17/835,626. Although the initial concept of sperm sorting technology and temperature difference environment model was proposed in the previous patent application, the application did not actually disclose a specific and complete technical means for creating an environment with temperature difference. Therefore, the research team of this disclosure based on years of experience in the related industry to conduct extensive research and experiment, and finally developed a heating culture device used to provide an environment with a vertical temperature difference and a method of using the heating culture device. By a structural design totally different from the concept of the horizontal temperature gradient difference, a stable and accurate environment with vertical temperature difference is provided to allow the living cells with the characteristic of autonomous activity to move in response to the environment in a thermotactic manner. The heating culture device of this disclosure is provided to select the required healthy cells, so as to improve the deficiencies of the existing sorting technology.

SUMMARY OF THE DISCLOSURE

It is a primary objective of the present disclosure to disclose a heating culture device used to provide an environment with a vertical temperature difference and a method of using the heating culture device. This disclosure has the effects of preventing adjacent upper and lower chambers from reaching thermal equilibrium, creating an environment with stable and accurate upper and lower temperature difference, and allowing the living cells having flagella and capable of moving autonomously to move in response to the environment with a vertical temperature gradient, which is conducive to sorting and selecting the required living cells with better quality.

To achieve the aforementioned and other objectives, this disclosure discloses a heating culture device used to provide an environment with a vertical temperature difference, and the heating culture device is provided for accommodating and heating the living cells having flagella and capable of moving autonomously. The cell separation device includes a film that allows the living cells to pass through and partitions the cell separation device into an upper chamber and a lower chamber. The heating culture device includes: a carrying assembly, further including: a cover, having an accommodating hole formed on the cover; a heating module, installed into the accommodating hole, and the heating module including a heat spreader, an upper electric heating plate and a heat insulating plate, the heat spreader having a front side and a back side, the upper electric heating plate and the heat insulating plate respectively installed on the back side of the heat spreader, the upper electric heating plate disposed between the heat insulating plate and the heat spreader; and a support frame, pivotally connected to an edge of the cover, and provided for making the cover to be opened and closed relative to the support frame, wherein the support frame has a chip mounting hole formed on the support frame, such that when the cover is closed relative to the support frame, the front side corresponds with the position of the chip mounting hole; a chip carrier box, installed to the chip mounting hole, and provided for placing the cell separation device, and an outer bottom surface of the chip carrier box having a plurality of cooling ribs, and a gap formed between any two adjacent cooling ribs; a case assembly, installed at the bottom of the support frame, and having at least one first air vent and at least one second air vent disposed on two opposite sides of the case assembly respectively; and a control assembly, including: a first temperature sensor, installed on a side of the heat spreader for detecting and obtaining a first measured temperature; a second temperature sensor, installed at the bottom of the chip carrier box for detecting and obtaining a second measured temperature; a fan, installed on an outer bottom surface of the chip carrier box and disposed inside the case assembly; and a control processor, installed in the case assembly and telecommunicatively connected to the first temperature sensor, the second temperature sensor, the fan and the heating module, and for setting a first target temperature and a second target temperature; wherein the control processor adjusts the driving state of the upper electric heating plate according to the temperature difference between the first measured temperature and the first target temperature, such that the first measured temperature matches with the first target temperature and adjusts the driving state of the fan according to the temperature difference between the second measured temperature and the second target temperature, such that the second measured temperature matches with the second target temperature; wherein when the cover is covered on the support frame, the upper chamber of the cell separating device is situated in a closed heating space above and heated by the front side, and the lower chamber of the cell separation device is situated in an open cooling space below and maintained at a temperature state lower than the upper chamber.

Preferably, the first target temperature is a numerical value falling within a range of 35~40° C., and the second target temperature is a numerical value falling within a range of 27~34° C., such that the upper chamber and the lower chamber of the cell separating device generate a temperature difference to provide a temperature state suitable for driving the autonomous movement of the living cells.

Preferably, the upper chamber of the cell separation device has a height of 1~10 mm, and the lower chamber of the cell separation device has a height of 2~6 mm, in order to provide a better moving space for the living cells and facilitate collecting the living cells.

Preferably, a foolproof temperature control slot is formed on the inner bottom of the chip carrier box and provided for placing the lower chamber in the foolproof temperature control slot along a corresponding direction to facilitate placing the cell separation device and increasing the contact area of the cell separation device by the foolproof temperature control slot, so as to improve the cooling effect.

Preferably, the cell separation device is made of a plastic material with a thermal conductivity of 0.14~0.3 w/m·° C. to provide a better culture sorting efficiency.

Preferably, the chip carrier box further includes a lower electric heating plate installed on a bottom surface of the chip carrier box to improve the control precision of the environment with a vertical temperature difference and the overall utilization efficiency.

Preferably, the heat spreader and the chip carrier box are made of aluminum, and the thickness of the heat spreader and the thickness of the heat insulating plate are in a ratio of 1:3~1:5 to provide heat conduction, heat resistance and other temperature control functions.

Preferably, the bottom of the chip carrier box is protruded from the bottom surface of the support frame, the fan is installed to the bottom of the support frame through a relay fixed plate, wherein the relay fixed plate is installed to the bottom surface of the support frame and has an interval apart from the bottom surface of the support frame, and the relay fixed plate has a cooling hole configured to be corresponsive to the chip carrier box, the fan is configured to be corresponsive to the cooling hole, so that an interval is formed between the relay fixed plate and the support frame bottom to form a state similar to an air channel, which is conducive to heat dissipation and cooling.

Preferably, the outer bottom surface of the chip carrier box is provided with a blank area, and the cooling ribs are installed along two opposite sides of the blank area. The special design of the chip carrier box can improve the cooling effect at the bottom position.

Preferably, the periphery of the chip carrier box is provided with at least one mounting column, the support frame has at least one mounting hole formed at a position adjacent to an edge of the chip mounting hole which is configured to be corresponsive to the mounting column, and provided for passing the mounting column to fix the chip carrier box to the chip mounting hole, so as to improve assembly stability.

Preferably, the cover has an accommodating space inside and the cover further includes at least one fixture and at least one fixing column with a through hole formed at the center of the fixing column, the fixing column is disposed in the accommodating space, the fixture is a long strip structure fixed with the fixing column by locking to fix the heating module, so as to fix the heating module more securely while providing a more convenient assembly. In addition, the outer bottom surface of the support frame is provided with at least one support column, and the support column has a wire hole to facilitate setting up the required line circuits and prevent disorder of the line circuits.

Preferably, an electric wire of the second temperature sensor is installed at any one or two or more of the gaps to provide better fixation of the line circuits.

Preferably, a side of the support frame that is opposite to a side pivotally connected to the cover and is extended to form a panel cover, a side of the case assembly is extended to form a panel assembling part, the panel assembling part is provided for installing the control processor, the panel cover is covered on the panel assembling part, wherein the control processor includes a buzzer unit and/or an indicating unit which are driven when reaching the heating time, having an overheat, or completing the preheat, so as to provide better overall structure with better configuration and remind users about some of the operating states.

Preferably, the other side of the case assembly is provided with a power supply module, the power supply module is electrically connected to the heating module and the control assembly, wherein an electric wire of the power supply module electrically connected to the heating module is pulled through a pivotal joint of the support frame and the cover to the heating module, not only allowing each component to have better installation and configuration, but also making the setup of line circuits more smoothly and neatly.

Preferably, the case assembly includes a casing and a main body, the casing is covered on the main body, a plurality of first air vents and second air vents that come with a quantity of two or more and are disposed on the casing, wherein the bottom surface of the main body is provided with at least one footer pad to improve the overall structural stability of the case assembly.

Based on the same technical concept, this disclosure also discloses a method of using the heating culture device, and the method includes the steps of: turning on the heating culture device; covering the cover on the support frame to preheat the heating culture device, wherein the preheat time of the heating culture device is 4~10 minutes; adding a specimen into the lower chamber of the cell separation device; adding a buffer solution into the upper chamber of the cell separation device; putting the cell separation device in the chip carrier box; covering the cover, and setting a culture time, wherein the culture time is 15~30 minutes; and taking out the cell separation device after the culture time.

In summation of the description above, this disclosure provides a heating culture device used to create an environment with a vertical temperature difference and a method of using heating culture device. The heating culture device can provide the environment with a vertical temperature difference including the film and the upper and lower chambers that carry the living cells having flagella and capable of moving autonomously, so that the living cells can move autonomously in response to temperature difference in order to obtain the required healthy living cells. In order to achieve a stable and accurate culture environment with a vertical temperature difference, the heating culture device uses a special design structure to confirm the temperature state at the heat spreader of the heating module and the bottom of the chip carrier box by the control assembly, and then dynamically controls the operating state of the fan and the upper electric heating plate according to the set first target temperature and second target temperature. In this way, the environmental state originally affected by the heating module and reaching a thermal equilibrium is adjusted and changed, and the temperature in the closed heating space above is greater than the temperature in the open cooling space below, which is conducive to the movement of the living cells towards the upper chamber of a higher temperature in response to the vertical temperature difference. After the cell separation device is removed, the required healthy and high percentage of living cells can be collected from the top. More technical characteristics of the heating culture device and its use will be elaborated by embodiments in details below.

DESCRIPTION OF THE PREFERRED EMBODIMENTS

Figure 1A:
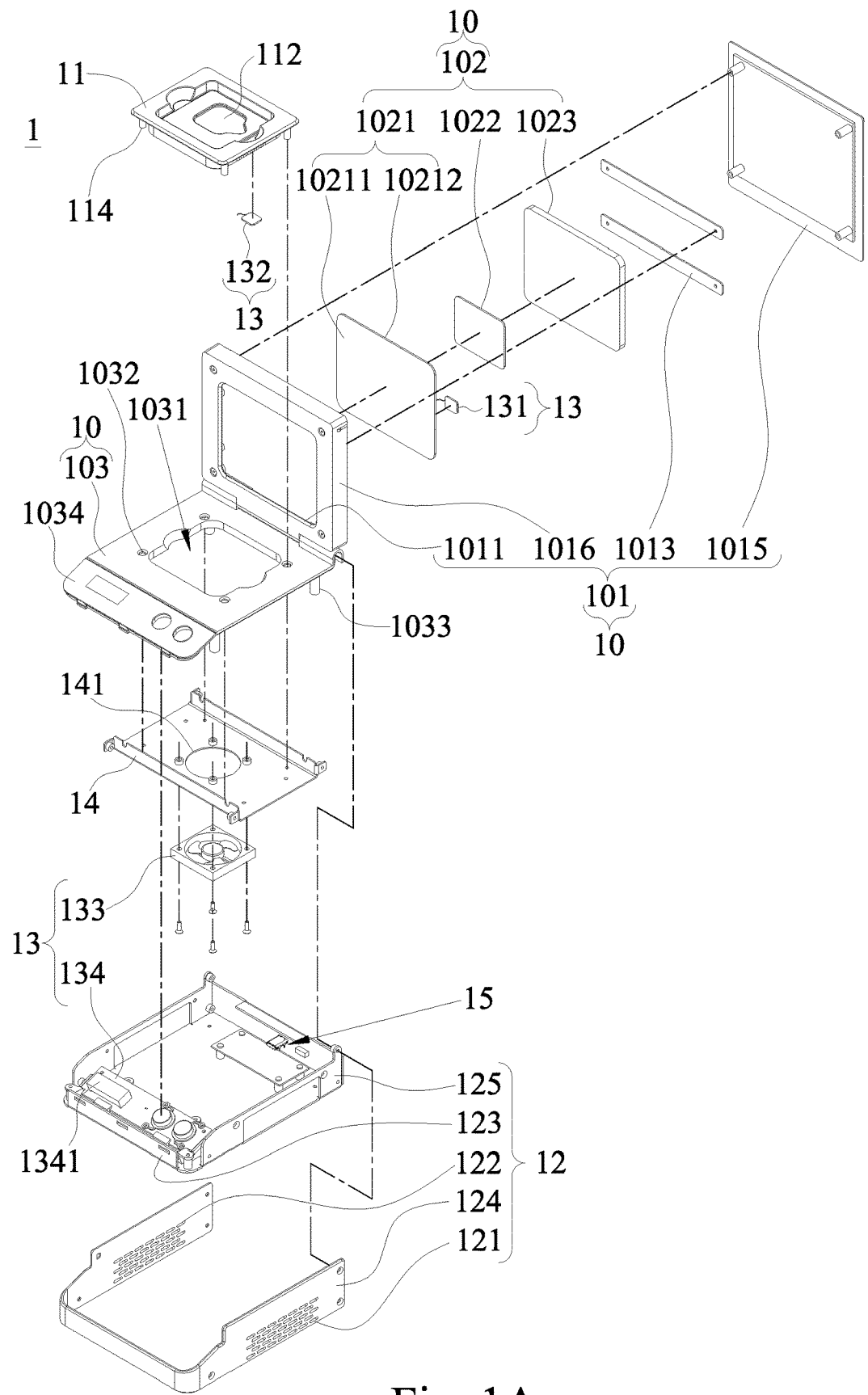
FIG. 1A is an exploded view of a heating culture device in accordance with a preferred embodiment of this disclosure.

The objectives, technical contents and features of this disclosure will become apparent in the following detailed description of the preferred embodiments with reference to the accompanying drawings. It is noteworthy that the drawings used in the specification and subject matters of this disclosure are intended for illustrating the technical characteristics of this disclosure, but not necessarily to be drawn according to actual proportion and precise configuration. Therefore, the scope of this disclosure should not be limited to the proportion and configuration of the drawings.

As mentioned above, there is still no comparatively good culture apparatus in the field of culturing and sorting the living cells having flagella and capable of moving autonomously. The research team of this disclosure based on the professional knowledge and rich experience in the field to combine the particularity of the living cells having flagella and capable of moving autonomously with two major sorting techniques, namely the swim-up technique and thermotaxis, and conceive and propose a heating culture device for an environment with a vertical temperature difference and its use. In order to make the content of this disclosure clear for those with ordinary skill in the art, the following description is provided together with the illustrative diagrams for reference.

With reference to FIGS. 1A, 1B, 2, 3, 4 and 5 for the two exploded views, the perspective view, the two cross-sectional views showing the structure and application of a heating culture device of a preferred embodiment and the partial exploded view of the other preferred embodiment of this disclosure respectively, the types of structures and the proportion of components shown in each figure are used to illustrate the technical characteristics of this disclosure, but should not be interpreted improperly for this disclosure. In order to make the description about the connection and relationship between the components more clearly, the parts used for the assembling and fixing purposes such as screws are omitted in FIGS. 1A, 1B and 5 for simplicity.

This disclosure is directed to a heating culture device used to provide an environment with a vertical temperature difference 1. The heating culture device 1 is provided for accommodating and heating a cell separation device 2, and the cell separation device 2 is provided for carrying living cells having flagella and capable of moving autonomously, wherein the cell separation device 2 includes a film 20 for passing through the living cells and partitioning the cell separation device 2 into an upper chamber 21 and a lower chamber 22. The heating culture device 1 includes a carrying assembly 10, a chip carrier box 11, a case assembly 12 and a control assembly 13.

The carrying assembly 10 includes a cover 101, a heating module 102 and a support frame 103. The cover 101 has an accommodating hole 1011, and the heating module 102 is installed to the accommodating hole 1011. The heating module 102 includes a heat spreader 1021, an upper electric heating plate 1022 and a heat insulating plate 1023. The heat spreader 1021 has a front side 10211 and a back side 10212, the upper electric heating plate 1022 and the heat insulating plate 1023 are disposed on the back side 10212 of the heat spreader 1021, and the upper electric heating plate 1022 is disposed between the heat spreader 1021 and the heat insulating plate 1023. Preferably, the heat insulating plate 1023 is a foam structure with a good thermal insulation effect. The support frame 103 is pivotally connected to an edge of the cover 101, such that the cover 101 can be opened and closed relative to the support frame 103, wherein the support frame 103 has a chip mounting hole 1031, and when the cover 101 is closed relative to the support frame 103, the front side 10211 corresponds with the position of the chip mounting hole 1031. It is noteworthy that the heating module 102 of this disclosure is a structure including the heat spreader 1021, the upper electric heating plate 1022 and the heat insulating plate 1023, the heat spreader 1021 acts as a primary heating element to ensure a uniform heat transfer in the heating process and avoid a too-high or too-low temperature in a certain area that will affect the culture of the living cells, and the heat insulating plate 1023 can reduce heat dissipation to achieve a better operating performance.

The chip carrier box 11 is installed into the chip mounting hole 1031 and provided for placing the cell separation device 2, an outer bottom surface of the chip carrier box 11 is provided with a plurality of cooling ribs 111, and a gap A is formed between any two adjacent cooling ribs 111. The contour shape of the chip carrier box 11 or the space of the chip carrier box 11 used for accommodating the cell separation device 2 is not limited to the shape of this embodiment only, but it can also be in a round shape, a polygonal shape or another shape.

The case assembly 12 is installed to the bottom of the support frame 103, the case assembly 12 has at least one first air vent 121 and at least one second air vent 122, and the first air vent 121 and the second air vent 122 are formed on two opposite sides of the case assembly 12 respectively to facilitate the case assembly 12 to form an open space communicated to the environment.

Figure 4:
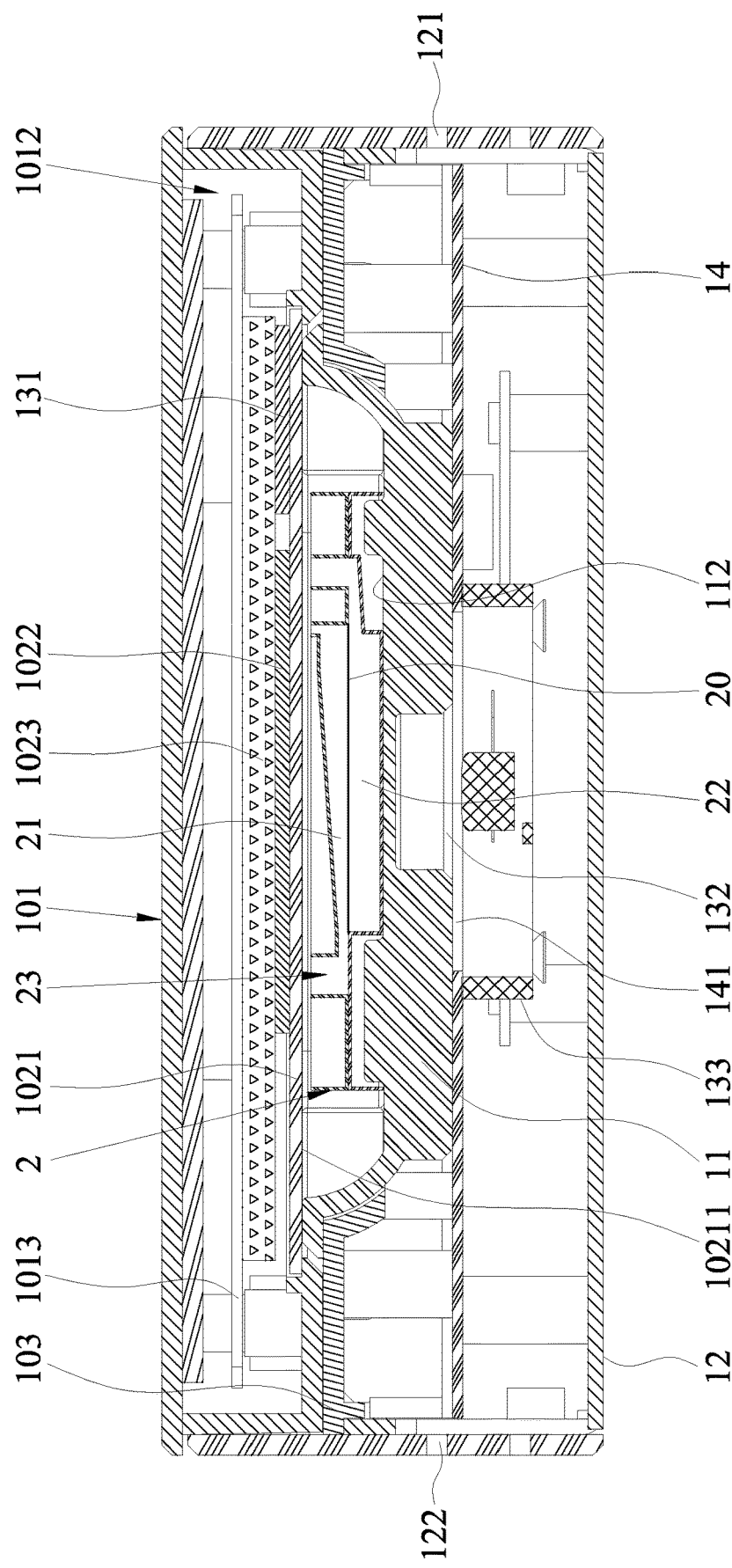
FIG. 4 is a cross-sectional view showing an application of a heating culture device in accordance with a preferred embodiment of this disclosure.

The control assembly 13 includes a first temperature sensor 131, a second temperature sensor 132, a fan 133 and a control processor 134. The first temperature sensor 131 is installed on a side of the heat spreader 1021 for detecting and obtaining a first measured temperature, and the second temperature sensor 132 is installed to a bottom position of the chip carrier box 11 for detecting and obtaining a second measured temperature. The fan 133 is installed at the outer bottom surface of the chip carrier box 11 and disposed in the case assembly 12, the control processor 134 is installed in the case assembly 12 and telecommunicatively connected to the first temperature sensor 131, the second temperature sensor 132, the fan 133 and the heating module 102. The control processor 134 is provided for setting a first target temperature and a second target temperature. The control processor 134 adjusts the driving state of the upper electric heating plate 1022 according to the difference between the first measured temperature and the first target temperature, such that the second measured temperature matches with the second target temperature, and adjusts the driving state of the fan 133 according to the difference between the second measured temperature and the second target temperature, such that the second measured temperature matches with the second target temperature. Specifically, the structure of the chip carrier box 11 together with the operation of the control assembly 13 can make the temperature control more convenient and definite. In these structural characteristics, the driving state of the fan 133 and the structure of the cooling ribs 121 can control the fan 133 not to reach a thermal equilibrium and effectively allow the bottom of the chip carrier box 11 to have a lower temperature, and provide a temperature gradient difference in the vertical direction, so as to facilitate the culture of the living cells carried by the cell separation device 2. When the cover 101 is covered on the support frame 103, the upper chamber 21 of the cell separation device 2 is situated in the closed heating space above, and heated by the front side 10211, and the lower chamber 22 of the cell separation device 2 is maintained at a temperature state lower than the upper chamber 21 by the open cooling space below, so as to facilitate the process of culturing and collecting the living cells as shown in FIG. 4.

In this way, the structure of the heating culture device 1 and the operation control of the control assembly 13 can provide a stable and accurate environment with a vertical temperature difference of the heating culture device 1, and keep the upper chamber 21 and the lower chamber 22 of the cell separation device 2 at a predetermined temperature difference state having higher temperature above and a lower temperature below to prompt the living cells to pass through the film 20 and move towards the upper chamber 21 of the higher temperature. After the culture carried out by the heating culture device 1, the required healthy living cells can be collected. Specifically, the heating culture device 1 controls driving states of the fan 133 and the upper electric heating plate 1022 by the setting and detection result of the control assembly 13 to adjust the cooling speed of the bottom of the chip carrier box 11 and the temperature state of the heat spreader 1021, so as to definitely form an environment with a vertical temperature difference. In other words, the heating culture device 1 controls not to be in thermal equilibrium after the cover 101 is covered on the support frame 103, so as to achieve a vertical temperature difference. After the cell separation device 2 is placed in the chip carrier box 11, and the environmental temperature difference is set to achieve the culture and collection effects.

The heating culture device 1 can have an appropriate temperature range such as the first target temperature is any numerical value within a range of 35~40° C., the second target temperature is any numerical value within a range of 27~34° C. Therefore, an environment with appropriate temperature difference is provided for the living cells in application, without affecting the activity state of the living cells by a too-high or too-low temperature.

The heating culture device 1 is applicable for carrying the living cells having flagella and capable of moving autonomously, such as sperms, and an embodiment of its application is given below for illustration. The liquified semen sample is injected into the lower chamber 22 of the cell separation device 2, and after a buffer solution is injected into the upper chamber 21 of the cell separation device 2 and placed in the chip carrier box 11, the cover 101 is covered, such that the environment with a vertical temperature difference provided by the heating culture device 1 can be used for the culture of living cells. It is noteworthy that after the heating culture device 1 is preheated, the cell separation device 2 is placed into the heating culture device 1, and the details of using the procedure will be described below. For example, the first target temperature is 37° C., and the second target temperature is 33° C. After the cover 101 is covered on the support frame 103, the first temperature sensor 131 and the second temperature sensor 132 will continuously detect the temperature of the heat spreader 1021 and the bottom of the chip carrier box 11, and the control processor 134 timely turns on or off the upper electric heating plate 1022 for heating, and turns on the fan 133 below for cooling. When the first measured temperature and the second measured temperature match with the first target temperature and the second target temperature respectively, the control processor 134 will show a preheat completion state. Now, the cell separation device 2 can be placed into the heating culture device 1. In the environment with a vertical temperature difference, the sperms inside the lower chamber 22 of the cell separation device 2 will overcome the gravity and swim up through the film 20 in response to the thermotaxis of the sperms since the position of the upper chamber 21 has a higher temperature, and further swim towards the interior of the upper chamber 21. After a certain period of time, the vigorous sperms at the top of the cell separation device 2 can be collected and obtained. Compared with the related art, the sperms sorted by the environment of the vertical temperature difference provided by the heating culture device 1 have more complete DNA, and a sufficient quantity of healthy and vigorous sperms can obtained at the same time For the cell separation device 2 placed inside the heating culture device 1, the research team of this disclosure based on the professional skill and experiment to provide a preferred embodiment for the illustration of this disclosure. For example, the upper chamber 21 of the cell separation device 2 has a height of 1~10 mm, and the lower chamber 22 of the cell separation device 2 has a height of 2~6 mm, to provide an appropriate accommodating space and facilitate responding to the environment with a vertical temperature difference provided by the heating culture device 1, and the upper chamber 21 and the lower chamber 22 have a lower and upper temperature difference. In the specific structural mode of the cell separation device 2, the upper chamber 21 and the lower chamber 22 are chambers of same height, or the upper chamber 21 has a distal height greater than that of the oblique chamber, and the upper chamber 21 has a lower height adjacent a collection hole 23 of the cell separation device 2, and the lower chamber 22 of the cell separation device 2 is a chamber of same height. In actual operation, it is observed that air bubbles are produced in the upper chamber 21 when a liquid is injected into the upper chamber 21, and when the upper chamber 21 is designed with an oblique structure, the space of the upper chamber 21 is increased effectively and even allows the air bubbles to move to a higher end due to the oblique top surface of the upper chamber 21, so as to reduce affecting the culture operation due to the air bubbles. Of course, the lower chamber 22 can be an oblique chamber, or the upper chamber 21 and the lower chamber 22 are chambers of same height, or the upper chamber 21 and the lower chamber 22 are both oblique chambers.

The structural characteristics of the heating culture device 1 are further described one by one below. The inner bottom of the chip carrier box 11 is further provided with a foolproof temperature control slot 112 provided for placing the lower chamber 22 in a corresponding direction. By the foolproof temperature control slot 112, the cell separation device 2 can be placed into the chip carrier box 11 in a specific direction, and the lower chamber 22 will be disposed in the foolproof temperature control slot 112. The direct contact between the foolproof temperature control slot 112 and the lower chamber 22 can improve the cooling effect and speed, and also can match the temperature of the lower chamber 22 with the temperature at the bottom of the chip carrier box 11. Particularly, when the foolproof temperature control slot 112 and the lower chamber 22 have corresponding contour shapes to further improve the above functions.

Further, the cell separation device 2 is made of a plastic material with a thermal conductivity of 0.14~0.3 w/m·° C. to improve the efficiency of the culture and sorting. The selected material with the specific thermal conductivity can better form an upper and lower temperature difference for the environment with a vertical temperature difference provided by the heating culture device 1 after the cell separation device 2 is placed into the heating culture device 1, so as to help reducing the culture time and improve the culture and sorting efficiency.

Figure 5:
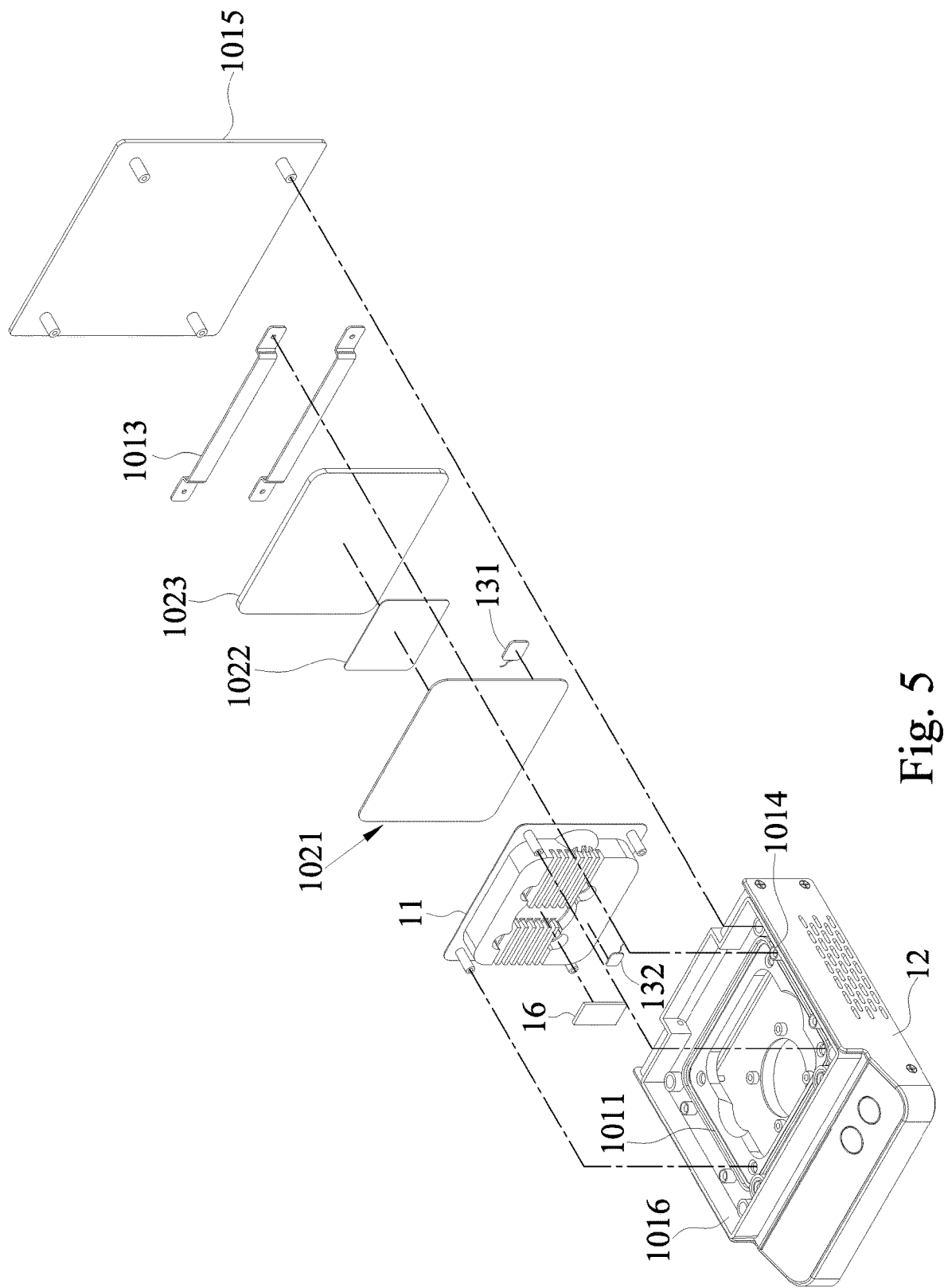
FIG. 5 is a partial exploded view of a heating culture device in accordance with another embodiment of this disclosure.

In addition, in order to let the heating culture device 1 produce the upper and lower temperature difference more quickly, an embodiment as shown in FIG. 5 is disclosed, wherein the bottom surface of the chip carrier box 11 is provided with a lower electric heating plate 16, and heated by the bottom of the chip carrier box 11. By the lower electric heating plate 16, the bottom of the chip carrier box 11 has a relatively higher initial temperature for use, without relying entirely on the heat received from the top of the chip carrier box 11 for the initial heating, so as to effectively reduce the time required for the upper and lower spaces of the heating culture device 1 to reach the predetermined temperature difference, and improve the temperature control precision of the lower space. Preferably, the lower electric heating plate 16 can be installed at the middle position of the chip carrier box 11. Of course, this is a preferred embodiment only, and the lower electric heating plate 16 can be actually installed in any area on the bottom surface of the chip carrier box 11, as long as the aforementioned function can be achieved.

With the consideration of the speed and uniformity of the heat transfer, the heat spreader 1021 and the chip carrier box 11 are made of aluminum, and the thickness of the heat spreader 1021 and the thickness of the heat insulating plate 1023 are in a ratio of 1:3~1:5. The heat spreader 1021 and the chip carrier box 11 made of aluminum can produce a more uniform heat transfer effect. Regardless of the heating part or the cooling part, both can have a better performance, and the thickness of the heat insulating plate 1023 and the thickness of the heat spreader 1021 fall within the aforementioned ratio range to maximize the performance of the upper electric heating plate 1022 and prevent depleting the heat on the back side 10212 and concentrate the heat on the front side 10211 as much as possible.

In an embodiment, the bottom outer surface of the chip carrier box 11 is further provided with a blank area 113, and the cooling ribs 111 are installed along two opposite sides of the blank area 113. The blank area 111 is provided for directly dissipating the heat to the outside by convection. After the blank area 111 corresponds to the area of the lower chamber 22 after the cell separation device 2 is placed into the chip carrier box 11, and the lower electric heating plate 16 can also be installed in the blank area 113 to directly perform the temperature control of the lower chamber 21 of the cell separation device 2. Of course, the fan 133 and the lower electric heating plate 16 can be configured to be corresponsive to the blank area 113 to make the temperature control more accurate.

In the heating culture device 1 in accordance with a preferred embodiment, the bottom of the chip carrier box 11 is protruded from the bottom surface of the support frame 103, the fan 133 is installed to the bottom of the support frame 103 by a relay fixed plate 14, wherein the relay fixed plate 14 is installed to the bottom surface of the support frame 103 and has an interval apart from the bottom surface of the support frame 103, the relay fixed plate 14 has a cooling hole 141 corresponding to the chip carrier box 11, the fan 133 is configured to be corresponsive to the cooling hole 141. With the aforementioned structural characteristics, the fan 133 and the chip carrier box 11 can be installed and fixed to appropriate positions, such that the fan 133 can provide a better cooling effect to the bottom of the chip carrier box 11. In addition, there is an interval between the relay fixed plate 14 and the bottom surface of the support frame 103 and the interval has an effect similar to that of an air channel to allow the fan 133 to be operated to produce a better cooling effect.

For a preferred fixation between the chip carrier box 11 and the support frame 103, the periphery of the chip carrier box 11 is provided with at least one mounting column 114, and the support frame 103 has at least one mounting hole 1032 formed at a position adjacent to an edge of the chip mounting hole 1031 and corresponding to the mounting column 114 for passing and installing the mounting column 114 to fix the chip carrier box 11 to the chip mounting hole 1031. By the structure of the mounting column 114 and the mounting hole 1032, the chip carrier box 11 can firmly be installed to the support frame 103, not just improving the structural strength and stability only, but also facilitating the assembly alignment. In this embodiment, there are four mounting columns 114 disposed at the periphery of the chip carrier box 11, and the edge of the chip mounting hole 1031 is also provided with a plurality of mounting holes 1032 with the quantity equal to that of the mounting columns 114. Since the chip carrier box 11 of this embodiment is substantially in a rectangular contour shape, the mounting columns 114 can be arranged at four corners of the chip carrier box 11 respectively.

Figure 1B:
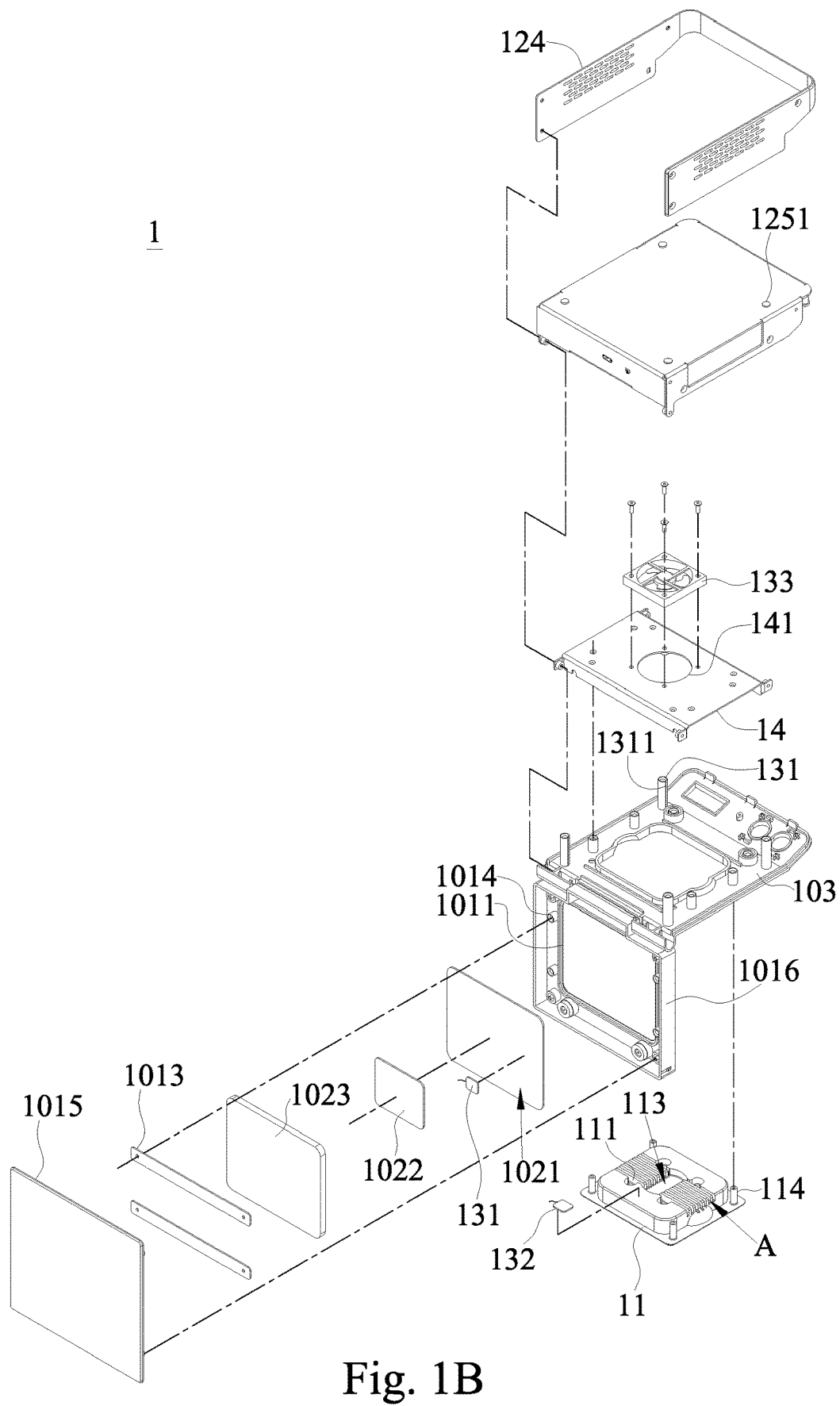
FIG. 1B is another exploded view of a heating culture device in accordance with a preferred embodiment of this disclosure; viewing from another angle.
Figure 2:
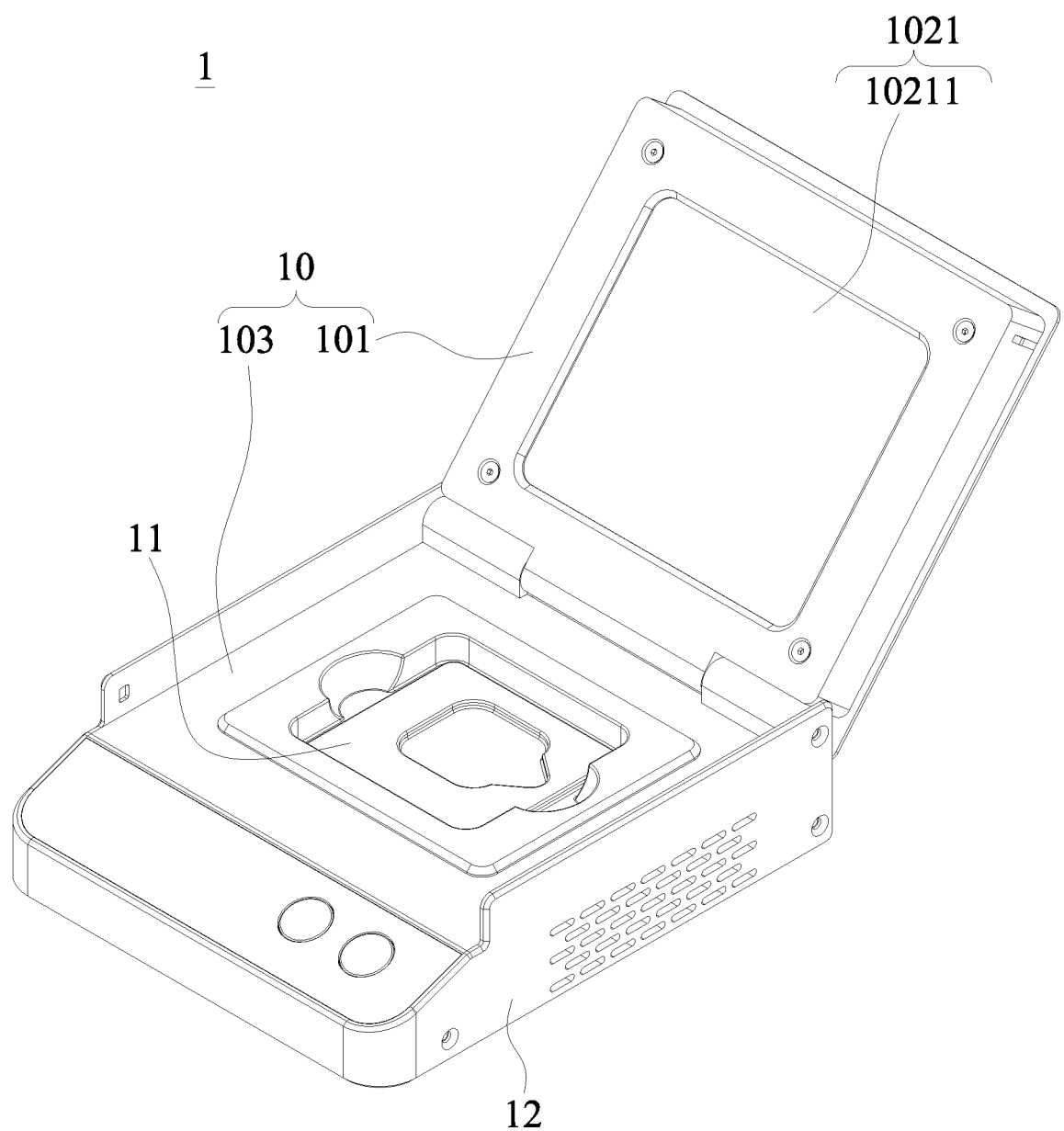
FIG. 2 is a perspective view of a heating culture device in accordance with a preferred embodiment of this disclosure.
Figure 3:
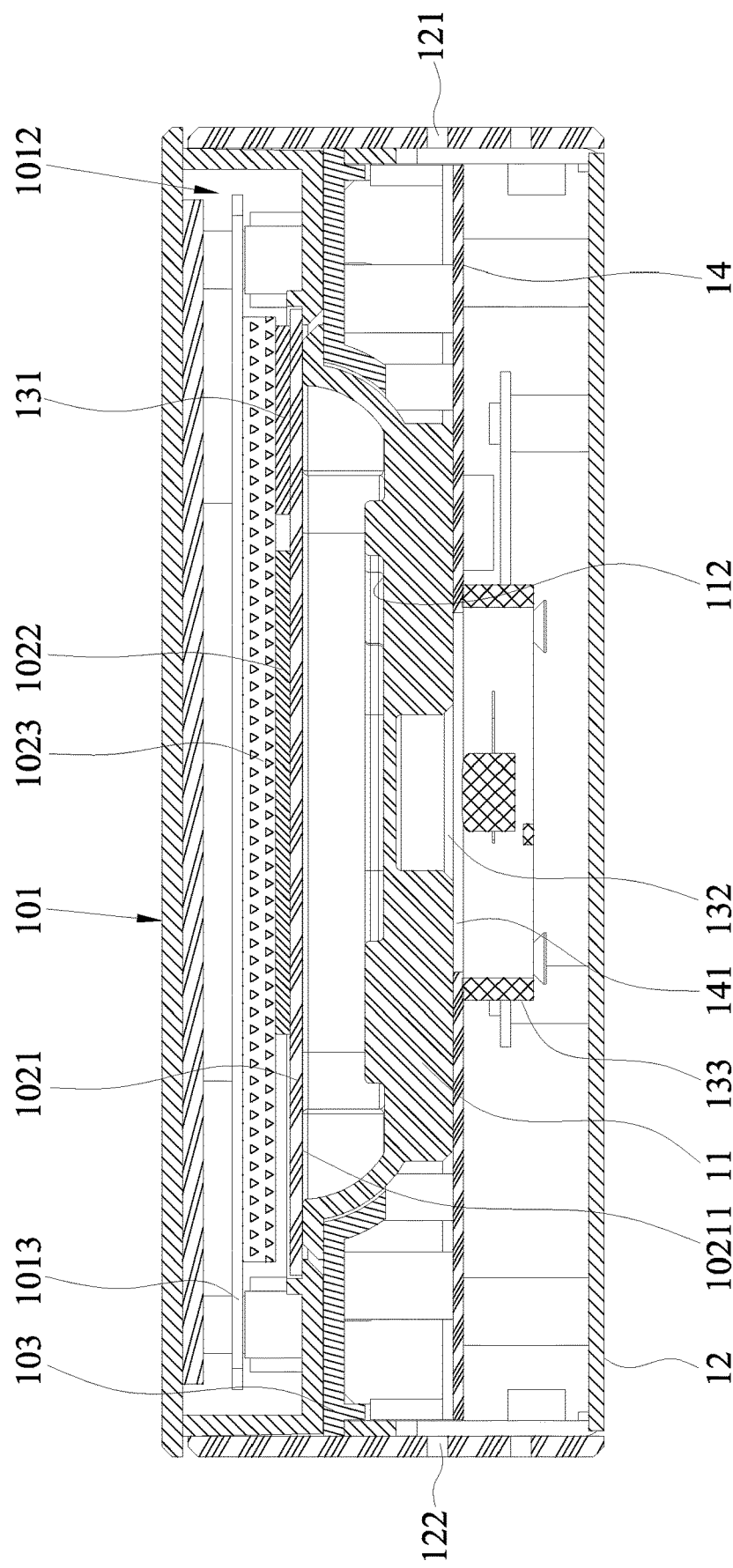
FIG. 3 is a cross-sectional view of a heating culture device in accordance with a preferred embodiment of this disclosure.

In the structure of the cover 101 of this preferred embodiment, the cover 101 has an accommodating space 1012 inside, and further includes at least one fixture 1013 and at least one fixing column 1014 with a through hole formed at the center of the fixing column 1014, the fixing column 1014 is disposed in the accommodating space 1012, the fixture 1013 is a long strip structure assembled with the fixing column 1014 to fix the heating module 102, so as to improve the assembly stability of the heating module 102 and provide a stable uniform heating through the front side 10211. Specifically, the cover 101 includes a structure of a first cover part 1015 and a second cover part 1016, the accommodating hole 1011 is formed at a position of the second cover part 1016, after the first cover part 1015 is covered on the second cover part 1016, the accommodating space 1012 is formed inside the cover 101, and the fixture 1013 is preferably a flat long strip structure or a long strip structure with a central depression. In FIGS. 1A and 1B, there are two fixtures 1013 which are smooth long strip structures, there are four fixing columns 1014, each of the fixtures 1013 is stacked on the heat insulating plate 1023 and two ends of the fixture 1013 is fixed to the fixing column 1014 by screws. In the embodiment as shown in FIG. 5, there are also two fixtures 1013 which are long strip structures with a central depression, and there are also four fixing columns 1014.

Other detailed structural characteristics of the heating culture device 1 in accordance with a preferred embodiment of this disclosure are elaborated below. The support frame 103 has at least one support column 1033 extended from the bottom surface of the support frame 103, and the support column 1033 has a wire hole 10331. By the structure of the support column 1033, the electrical wire of electrical components in the heating culture device 1 can be pulled and fixed through the wire hole 10331 formed on the support column 1033 to prevent disordered line circuits, while the support column 1033 can act as a structure for assembling and fixing the support frame 103 with the case assembly 12 to improve the overall structural strength and stability. In this embodiment, there are four support columns 1033. It is noteworthy that the pulling of the electric wire can be designed by setting the electric wire of the second temperature sensor 132 at any one gap or two or more gaps to prevent the electric wire from drooping freely which affects the overall assembly. In view of the description above, the technical characteristics of the electric wire of the second temperature sensor 132 installed to the gap A and the remaining electrical wire of the electrical components pulled and fixed through the wire hole 10331 can be understood, therefore the aforementioned pulling state of the electric wire is not specially shown in the figures for simplicity to better show the overall structural characteristics of this disclosure.

In addition, the support frame 103 pivotally connected to a side of the cover 101 is extended to form a panel cover 1034, a side of the case assembly 12 is extended to form a panel assembling part 123, the panel assembling part 123 is installed to the control processor 134, and the panel cover 1034 is covered on the panel assembling part 123, wherein the control processor 134 includes a buzzer unit (not shown in the figure) and/or an indicating unit 1341 which is driven when reaching the heating time, having an overheat, or completing the preheat. In this way, the control processor 134 can respond to the panel assembling part 123 to present an outward pushing state compared to the case assembly 12, and the control processor 134 further includes the buzzer unit and/or the indicating unit 1341 to achieve the prompt effect by sound and/or visual display.

With the consideration of the configuration of components of the heating culture device 1, the case assembly 12 of a preferred embodiment has a power supply module 15 installed on another side of the panel assembling part 123 and electrically connected to the heating module 102 and the control assembly 13, wherein the electric wire of the power supply module 15 electrically connected to the heating module 102 is pulled through the pivotally connection position of the support frame 103 and the cover 101 to the heating module 102. Therefore, the power supply module 15 installed on the other side of the case assembly 12 can be installed in an area in a more balanced manner, while reducing the affection to the cooling area, and the electric wire of the power supply module 15 electrically connected to the heating module 102 can be pulled through the pivotal connection position of the support frame 103 and the cover 101 to the cover 101 to give a better wiring design. In order to make the structural characteristics more clearly, the electric wires of the power supply module 15 and their pulling direction are not specially shown in the figures, but the technical characteristics can still be understood through the above description.

As to the part of the case assembly 12, the case assembly 12 of a preferred embodiment includes a casing 124 and a main body 125, the casing 124 is covered on the main body 125, and there are two or more of the first air vents 121 and second air vents 122 respectively formed on the casing 124, wherein the bottom surface of the main body 125 is provided with at least one footer pad 1251. With the structural characteristics, the overall case assembly 12 is more stable, and the arrangement of the first air vents 121 and the second air vents 122 formed on the casing 124 is easier to improve the variability of the hole, and the footer pad 1251 is provided for effectively improving the stability of the heating culture device 1 when the heating culture device 1 is placed.

Figure 6:
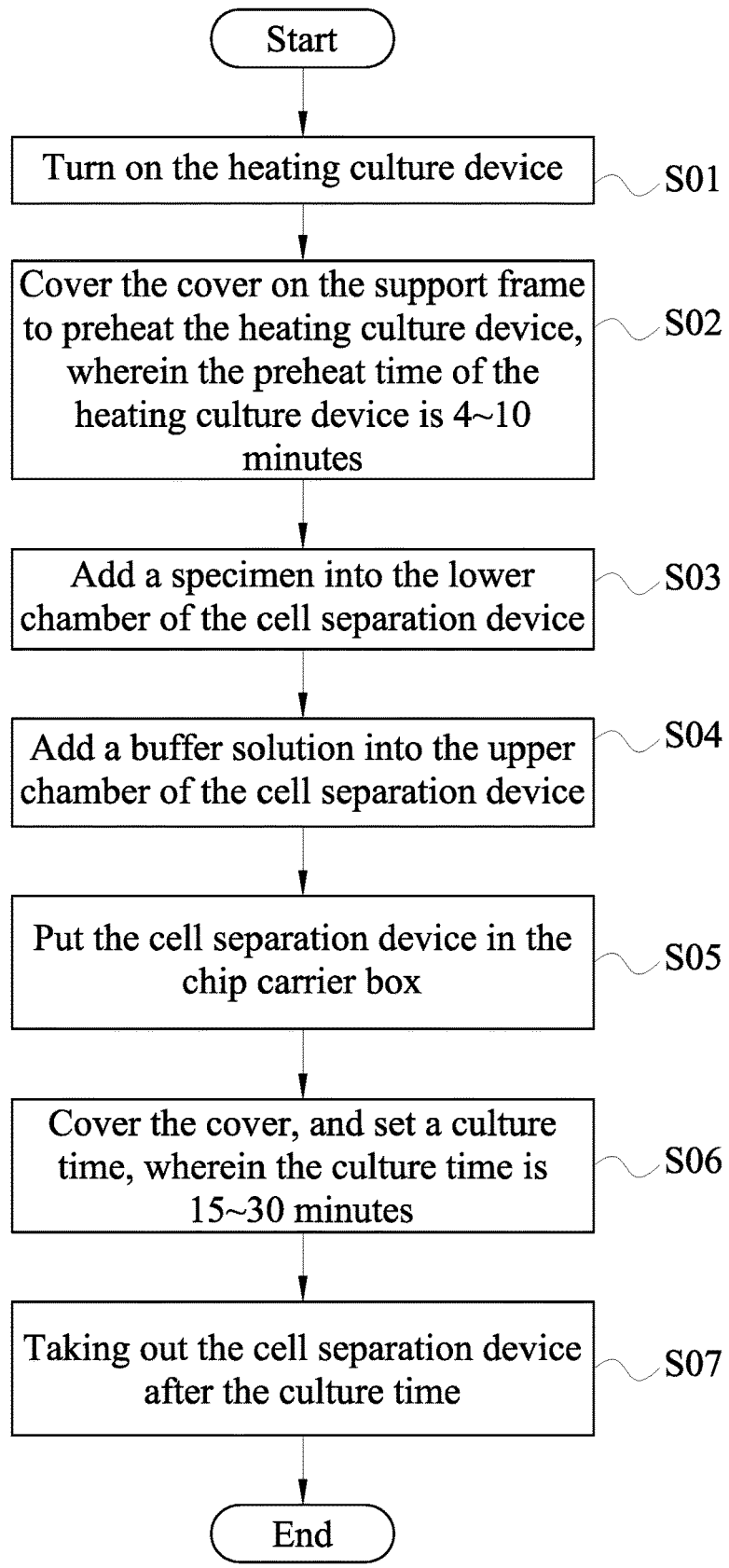
FIG. 6 is a flow chart of a method of using a heating culture device in accordance with a preferred embodiment of this disclosure.

The method of using the heating culture device 1 as shown in FIGS. 1A~4 in accordance with a preferred embodiment of this disclosure will be described together with the flow chart of the method as illustrated FIG. 6 below, the method of using the heating culture device 1 includes the following steps S01~S07: (S01) Turn on the heating culture device 1. (S02) Cover the cover 101 on the support frame 103 to preheat the heating culture device 1 for a preheat time of 4~10 min, and more specifically 5 min, such that during the preheat process, the control assembly 13 can match the temperature of the heat spreader 1021 and the temperature at the bottom of the chip carrier box 11 with the first target temperature and the second target temperature respectively, so as to create an environment with a vertical temperature difference.

(S03) Add a specimen into the lower chamber 22 of the cell separation device 2. (S04) Add a buffer solution into the upper chamber 21 of the cell separation device 2. (S05) Place the cell separation device 2 into the chip carrier box 11 after completing the step (S04). (S06) Cover the cover 101 and set a culture time, wherein the culture time is 15~30 min., and preferably set to 15~30 min. according to the professional knowledge of the research team of this disclosure in order to avoid a too-long or too-short culture that affects the quality of the selected living cells. (S07) Finally, take out the cell separation device 2 after the culture time, and collect the required healthy living cells from the top of the cell separation device 2. A preferred application condition is provided for culturing and sorting healthy sperm cells, now the specimen is a group of unsorted sperms, and the buffer solution is a liquid that contains protein bicarbonates or a liquid containing a HEPES buffer.

The specific structural characteristics and effects of the heating culture device 1 have been described above. After the cell separation device 2 of the heating culture device 1 is used to culture the living cells in the environment with a vertical temperature difference according to the above-mentioned procedure, the living cells can swim up to the upper chamber 21 of the cell separation device 2 in response to the thermotactic characteristic of living cells, so that the required healthy and vigorous cells can be collected.

In summation of the description above, this disclosure provides the heating culture device and its using method to recreate an environment with a vertical temperature difference by using the film and the upper and lower chambers and stably carry the living cells having flagella and capable of moving autonomously and allow the living cells to move autonomously according to the temperature difference, so as to obtain the required healthy living cells. It is noteworthy that this disclosure is novel in the related art, and there is no specific heating culture device that can provide an environment with a vertical temperature difference. To create a temperature difference in the vertical direction, in addition to reducing the volume and required space compared to the horizontal temperature gradient difference device, the method can also sort and obtain more healthy and vigorous cells with intact DNA by the swim-up technique. In addition, creating the vertical temperature difference is more than simply setting the rotation angle of the horizontal device, but there are still many details needed to be considered, especially how to control the internal space of the device in order to avoid thermal equilibrium, which is a very difficult issue. The research team of this disclosure based on years of experience in the related industry to conduct extensive research and experiment and finally and conceived and developed the heating culture device and using method in accordance with this disclosure to overcome the deficiencies of the related art.

To restate here, the technical features of the heating culture device are that the heating culture device which should theoretically reach the environment state of thermal equilibrium can be designed with an environment with upper and lower temperature difference (or not in thermal equilibrium) by means of the control assembly, the first and second temperature sensors are provided for continuously detecting the temperature of the heat spreader and the bottom of the chip carrier box, the control processor timely turns on or off the upper electric heating plate for heating and turns on the fan below for cooling, so that there will be a temperature difference between the upper chamber and the lower chamber of the cell separating device, so as to provide a stable and accurate environment with a vertical temperature difference for the living cells in the cell separation device to achieve the culturing objective by moving towards a high temperature area in response to the environment with the temperature difference environment. The heating culture device further has the following technical characteristics as illustrated in the embodiments. For example, the heating culture device can provide the preferred first target temperature range and second target temperature range, or an applicable structural configuration of the cell separation device of the heating culture device. In addition, specific technical features at the structural level such as materials and dimensions can be added, and the cooling control performance of the lower chamber can be improved by the configurations of the lower heating plate, the foolproof temperature control slot, the blank area, the relay fixed plate and the fan; the mounting column, the mounting hole, the fixture, the fixing column, the support column and the casing and the structural characteristics of the main body, etc., are conducive to improving the convenience of assembly of various components and structural stability after assembly. The structural characteristics of the mounting column, the mounting hole, the fixture, the fixing column, and the support column of the main body, and the casing are conducive to improving the convenience of assembling various components and the structural stability after assembly. Based on the appropriateness of spatial utilization and structural configuration, etc., this disclosure also proposes more specific settings for the design of the control processor, the power supply module and the electric wires of various electronic components, and allows the control processor to have a prompt function to improve the convenience of use.

What is claimed is:

1. A heating culture device used to provide an environment with a vertical temperature difference, and provided for accommodating and heating a cell separation device, and the cell separation device being provided for carrying a living cell having flagella and capable of moving autonomously, and the cell separation device comprising a film that allows the living cell to pass through and separates the cell separating device into an upper chamber and a lower chamber, and the heating culture device comprising:

a carrying assembly, further comprising:

a cover, comprising an accommodating hole formed thereon;

a heating module, installed into the accommodating hole, and the heating module further comprising a heat spreader, an upper electric heating plate, and a heat insulating plate, the heat spreader having a front side and a back side, the upper electric heating plate and the heat insulating plate respectively installed on the back side of the heat spreader, and the upper electric heating plate disposed between the heat insulating plate and the heat spreader; and a support frame, pivotally coupled to an edge of the cover, for making the cover to be opened and closed relative to the support frame, wherein the support frame has a chip mounting hole formed thereon, and when the cover is closed relative to the support frame, the front side corresponds with the position of the chip mounting hole;

a chip carrier box, installed to the chip mounting hole, and provided for placing the cell separation device, and an outer bottom surface of the chip carrier box having a plurality of cooling ribs, and a gap formed between any two adjacent cooling ribs;

a case assembly, installed at a bottom of the support frame, and having at least one first air vent and at least one second air vent, which are disposed on two opposite sides of the case assembly respectively; and a control assembly, comprising:
  a first temperature sensor, installed on a side of the heat spreader for detecting and obtaining a first measured temperature;
  a second temperature sensor, installed at a bottom of the chip carrier box for detecting and obtaining a second measured temperature;
  a fan, installed on an outer bottom surface of the chip carrier box and disposed inside the case assembly; and
  a control processor, installed in the case assembly and telecommunicatively coupled to the first temperature sensor, the second temperature sensor, the fan and the heating module, and the control processor is for setting a first target temperature and a second target temperature; wherein the control processor adjusts driving state of the upper electric heating plate according to difference between the first measured temperature and the first target temperature, such that the first measured temperature matches with the first target temperature and adjusts a driving state of the fan according to difference between the second measured temperature and the second target temperature, such that the second measured temperature matches with the second target temperature;
  wherein, when the cover is covered on the support frame, the upper chamber of the cell separating device is situated in an upper closed heating space, and heated by the front side, and the lower chamber of the cell separation device is situated in a lower open cooling space and maintained at a temperature state lower than the upper chamber.

2. A method of using a heating culture device of claim 1, comprising the steps of:
  turning on the heating culture device;
  covering the cover on the support frame to preheat the heating culture device, wherein the preheat time of the heating culture device is 4-10 minutes;
  adding a specimen into the lower chamber of the cell separation device;
  adding a buffer solution into the upper chamber of the cell separation device;
  putting the cell separation device in the chip carrier box;
  covering the cover on the support frame, and setting a culture time, wherein the culture time is 15-30 minutes; and
  taking out the cell separation device after the culture time.

3. The heating culture device according to claim 1, wherein the first target temperature is a numerical value falling within a range of 35-40° C., and the second target temperature is a numerical value falling within a range of 27-34° C.

4. A method of using a heating culture device of claim 3, comprising the steps of:
  turning on the heating culture device;
  covering the cover on the support frame to preheat the heating culture device, wherein the preheat time of the heating culture device is 4-10 minutes;
  adding a specimen into the lower chamber of the cell separation device;
  adding a buffer solution into the upper chamber of the cell separation device;
  putting the cell separation device in the chip carrier box;
  covering the cover on the support frame, and setting a culture time, wherein the culture time is 15-30 minutes; and
  taking out the cell separation device after the culture time.

5. The heating culture device according to claim 3, wherein the upper chamber of the cell separation device has a height of 1-10 mm, and the lower chamber of the cell separation device has a height of 2-6 mm.

6. A method of using a heating culture device of claim 5, comprising the steps of:
  turning on the heating culture device;
  covering the cover on the support frame to preheat the heating culture device, wherein the preheat time of the heating culture device is 4-10 minutes;
  adding a specimen into the lower chamber of the cell separation device;
  adding a buffer solution into the upper chamber of the cell separation device;
  putting the cell separation device in the chip carrier box;
  covering the cover on the support frame, and setting a culture time, wherein the culture time is 15-30 minutes; and
  taking out the cell separation device after the culture time.

7. The heating culture device according to claim 5, wherein the chip carrier box further comprising a foolproof temperature control slot formed on an inner bottom thereof and provided for placing the lower chamber therein along a corresponding direction.

8. A method of using a heating culture device of claim 7, comprising the steps of:
  turning on the heating culture device;
  covering the cover on the support frame to preheat the heating culture device, wherein the preheat time of the heating culture device is 4-10 minutes;
  adding a specimen into the lower chamber of the cell separation device;
  adding a buffer solution into the upper chamber of the cell separation device;
  putting the cell separation device in the chip carrier box;
  covering the cover on the support frame, and setting a culture time, wherein the culture time is 15-30 minutes; and
  taking out the cell separation device after the culture time.

9. The heating culture device according to claim 7, wherein the cell separation device is made of a plastic material with a thermal conductivity of 14-0.3 w/m C.

10. A method of using a heating culture device of claim 9, comprising the steps of:
  turning on the heating culture device;
  covering the cover on the support frame to preheat the heating culture device, wherein the preheat time of the heating culture device is 4-10 minutes;
  adding a specimen into the lower chamber of the cell separation device;
  adding a buffer solution into the upper chamber of the cell separation device;

putting the cell separation device in the chip carrier box;
covering the cover on the support frame, and setting a culture time, wherein the culture time is 15-30 minutes; and
taking out the cell separation device after the culture time.

11. The heating culture device according to claim 9, wherein the chip carrier box further comprising a lower electric heating plate installed on a bottom surface thereof.

12. A method of using a heating culture device of claim 11, comprising the steps of:
turning on the heating culture device;
covering the cover on the support frame to preheat the heating culture device, wherein the preheat time of the heating culture device is 4-10 minutes;
adding a specimen into the lower chamber of the cell separation device;
adding a buffer solution into the upper chamber of the cell separation device;
putting the cell separation device in the chip carrier box;
covering the cover on the support frame, and setting a culture time, wherein the culture time is 15-30 minutes; and
taking out the cell separation device after the culture time.

13. The heating culture device according to claim 11, wherein the heat spreader and the chip carrier box are made of aluminum, and a thickness of the heat spreader and a thickness of the heat insulating plate are in a ratio of 1:3-1:5.

14. A method of using a heating culture device of claim 13, comprising the steps of:
turning on the heating culture device;
covering the cover on the support frame to preheat the heating culture device, wherein the preheat time of the heating culture device is 4-10 minutes;
adding a specimen into the lower chamber of the cell separation device;
adding a buffer solution into the upper chamber of the cell separation device;
putting the cell separation device in the chip carrier box;
covering the cover on the support frame, and setting a culture time, wherein the culture time is 15-30 minutes; and
taking out the cell separation device after the culture time.

15. The heating culture device according to claim 13, wherein the bottom of the chip carrier box protruding out from a bottom surface of the support frame, the fan is installed to the bottom of the support frame through a relay fixed plate, the relay fixed plate is installed on the bottom surface of the support frame and spaced with an interval from the bottom surface of the support frame, the relay fixed plate has a cooling hole formed thereon and configured to be corresponsive to the chip carrier box, the fan is configured to be corresponsive to the cooling hole; the outer bottom surface of the chip carrier box is further provided with a blank area, the cooling ribs are installed along two opposite sides of the blank area, and periphery of the chip carrier box is provided with at least one mounting column, the support frame has at least one mounting hole formed at a position adjacent to an edge of the chip mounting hole, configured to be corresponsive to the mounting column, and provided for passing the mounting column to fix the chip carrier box to the chip mounting hole.

16. A method of using a heating culture device of claim 15, comprising the steps of:
turning on the heating culture device;
covering the cover on the support frame to preheat the heating culture device, wherein the preheat time of the heating culture device is 4-10 minutes;
adding a specimen into the lower chamber of the cell separation device;
adding a buffer solution into the upper chamber of the cell separation device;
putting the cell separation device in the chip carrier box;
covering the cover on the support frame, and setting a culture time, wherein the culture time is 15-30 minutes; and
taking out the cell separation device after the culture time.

17. The heating culture device according to claim 15, wherein the cover has an accommodating space therein and further comprises at least one fixture and at least one fixing column with a through hole formed at center thereof, the fixing column is disposed in the accommodating space, the fixture is a long strip structure fixed with the fixing column by locking and provided for fixing the heating module, an outer bottom surface of the support frame is provided with at least one support column, the support column has a wire hole formed thereon, an electric wire of the second temperature sensor is installed at any one or two or more of the gaps; a side of the support frame that is opposite to a side pivotally coupled to the cover is extended to form a panel cover, a side of the case assembly is extended to form a panel assembling part, the panel assembling part is provided for installing the control processor, the panel cover is covered on the panel assembling part, wherein the control processor comprises a buzzer unit and/or an indicating unit and is driven when reaching a heating time, having an overheat, or completing a preheat, and another side of the case assembly is provided with a power supply module, the power supply module is electrically coupled to the heating module and the control assembly, wherein an electric wire of the power supply module electrically coupled to the heating module is pulled through a pivotal joint of the support frame and the cover to the heating module; the case assembly comprises a casing and a main body, the casing is covered on the main body, and the first air vent and the second air vent come with a quantity of two or more and are disposed on the casing, wherein a bottom surface of the main body is provided with at least one footer pad.

18. A method of using a heating culture device of claim 17, comprising the steps of:
turning on the heating culture device;
covering the cover on the support frame to preheat the heating culture device, wherein the preheat time of the heating culture device is 4-10 minutes;
adding a specimen into the lower chamber of the cell separation device;
adding a buffer solution into the upper chamber of the cell separation device;
putting the cell separation device in the chip carrier box;
covering the cover on the support frame, and setting a culture time, wherein the culture time is 15-30 minutes; and
taking out the cell separation device after the culture time.

\* \* \* \* \*